United States Patent
Goldman et al.

(10) Patent No.: US 6,384,712 B1
(45) Date of Patent: May 7, 2002

(54) APPARATUS, SYSTEM, AND METHOD FOR COMMUNICATION BETWEEN MULTIPLE BASE STATIONS AND RADIO FREQUENCY (RF) TAGS

(75) Inventors: Kenneth Alan Goldman, Norwalk, CT (US); Li-Cheng Richard Zai, Los Gatos, CA (US)

(73) Assignee: Intermec IP Corp., DE (US)

( * ) Notice: Subject to any disclaimer, the term of this patent is extended or adjusted under 35 U.S.C. 154(b) by 0 days.

(21) Appl. No.: 09/212,909

(22) Filed: Dec. 16, 1998

Related U.S. Application Data

(60) Provisional application No. 60/068,122, filed on Dec. 19, 1997.

(51) Int. Cl.[7] ............................................... H04Q 5/22
(52) U.S. Cl. ..................... 340/10.3; 340/10.2; 340/42; 340/44; 340/50; 340/51; 370/236; 370/449
(58) Field of Search ......................... 340/825.2, 825.21, 340/10.1, 10.31, 825.49, 825.69, 825.72, 311.1, 103, 151, 42, 44, 50, 51, 10.2; 370/236, 449, 10.3

(56) References Cited

U.S. PATENT DOCUMENTS

| 5,390,360 | A | * | 2/1995 | Scop et al. ................. 455/34.2 |
| 5,450,087 | A | * | 9/1995 | Hurta et al. ................... 342/42 |
| 5,455,575 | A | | 10/1995 | Schuermann |
| 5,777,561 | A | | 7/1998 | Cofino et al. |

FOREIGN PATENT DOCUMENTS

| EP | 0 427342 A | 5/1991 |
| EP | 0 851 239 A | 7/1998 |
| WO | WO98 16070 | 4/1998 |

\* cited by examiner

*Primary Examiner*—Michael Horabik
*Assistant Examiner*—M Shimizu
(74) *Attorney, Agent, or Firm*—Rodney T. Hodgson

(57) ABSTRACT

An apparatus, a system, and a method for communication between multiple base stations and radio frequency (RF) transponders (RF Tags) is disclosed. A first radio frequency (RF) base station for communicating RF signals with an RF tag communicates external trigger signals with at least a second RF base station, which causes the second RF base station to begin transmission.

3 Claims, 3 Drawing Sheets

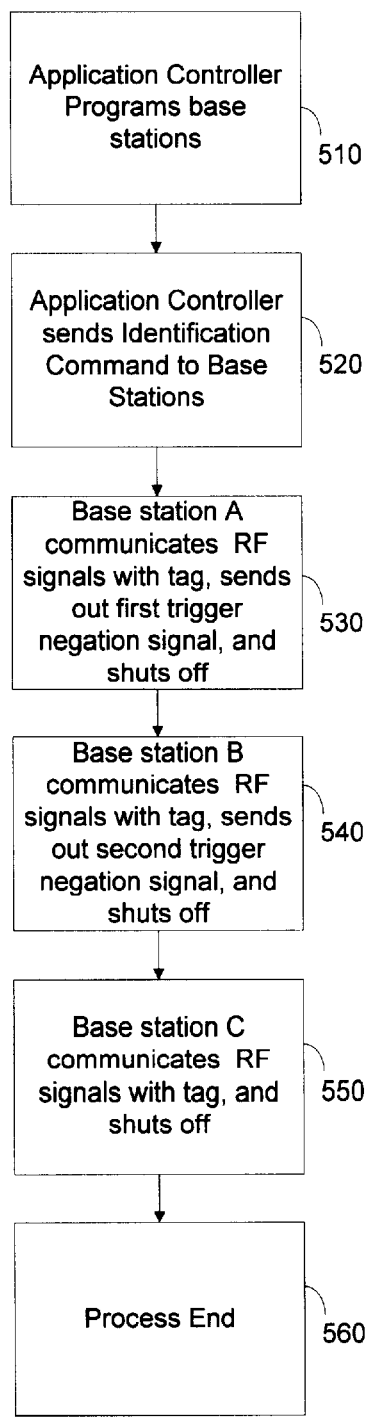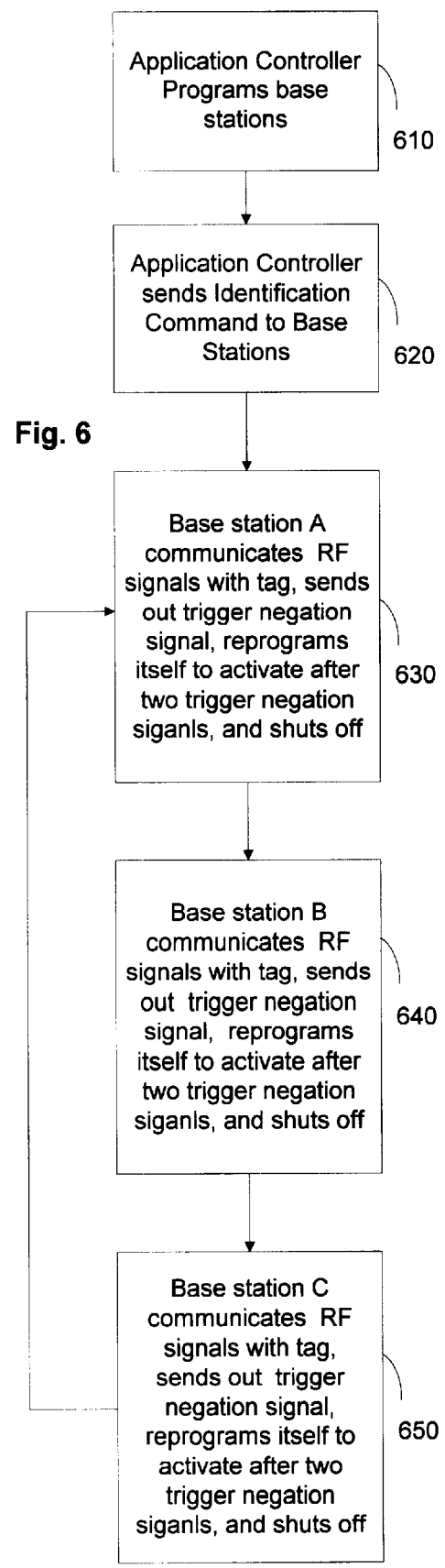
Fig. 5
Fig. 6

APPARATUS, SYSTEM, AND METHOD FOR COMMUNICATION BETWEEN MULTIPLE BASE STATIONS AND RADIO FREQUENCY (RF) TAGS

CROSS REFERENCE TO RELATED APPLICATION

The present application claims priority pursuant to 35 U.S.C. 119(e) to U.S. Provisional Application, Serial No. 60/068,122, filed Dec. 19, 1997.

FIELD OF THE INVENTION.

The field of the invention is the field of Radio Frequency (RF) Transponders (RF Tags), wherein one or more base stations communicates information to one or more RF Tags which may contain logic and memory circuits for storing information about objects, people, items, or animals associated with the RF Tags. The RF Tags can be used for identification and location (RFID Tags) of objects and to send information to the base station by modulating the load on an RF Tag antenna. More specifically, the invention relates to a radio frequency tagging system that allows multiple base stations to coordinate their activity. This allows the base stations to efficiently cover a larger zone than one base station while still meeting regulatory requirements.

BACKGROUND OF THE INVENTION

RF Tags can be used in a multiplicity of ways for locating and identifying accompanying objects, items, animals, and people, whether these objects, items, animals, and people are stationary or mobile, and transmitting information about the state of the of the objects, items, animals, and people. It has been known since the early 60's in U.S. Pat. No. 3,098,971 by R. M. Richardson, that electronic components on a transponder could be powered by radio frequency (RF) power sent by a "base station" at a carrier frequency and received by an antenna on the tag. The signal picked up by the tag antenna induces an alternating current in the antenna which can be rectified by an RF diode and the rectified current can be used for a power supply for the electronic components. The tag antenna loading is changed by something that was to be measured, for example a microphone resistance in the cited patent. The oscillating current induced in the tag antenna from the incoming RF energy would thus be changed, and the change in the oscillating current would lead to a change in the RF power radiated from the tag antenna. This change in the radiated power from the tag antenna can be picked up by the base station antenna and thus the microphone would in effect broadcast power without itself having a self contained power supply. In the cited patent, the antenna current also oscillates at a harmonic of the carrier frequency because the diode current contains a doubled frequency component, and this frequency can be picked up and sorted out from the carrier frequency much more easily than if it were merely reflected. Since this type of tag carries no power supply of its own, it is called a "passive" tag to distinguish it from an active tag containing a battery. The battery supplies energy to run the active tag electronics. An active tag may also change the loading on the tag antenna for the purpose of transmitting information to the base station, or it may act as a transmitter to broadcast the information from the tag antenna directly to the base station.

The "rebroadcast" of the incoming RF energy at the carrier frequency is conventionally called "back scattering", even though the tag broadcasts the energy in a pattern determined solely by the tag antenna and most of the energy may not be directed "back" to the transmitting antenna.

In the 70's, suggestions to use tags with logic and read/write memories were made. In this way, the tag could not only be used to measure some characteristic, for example the temperature of an animal in U.S. Pat. No. 4,075,632 to Baldwin et. al., but could also identify the animal. The antenna load was changed by use of a transistor.

Prior art tags have used electronic logic and memory circuits and receiver circuits and modulator circuits for receiving information from the base station and for sending information from the tag to the base station.

U.S. Pat. No. 5,214,410, hereby incorporated by reference, teaches a method for a base station to communicate with a plurality of Tags.

Prior art tags typically use a number of discrete components connected together with an antenna. However, to substantially reduce the cost of the tags, a single chip connected to an antenna must be used.

In a typical configuration, an application controller (ie work station, computer, microcomputer etc.) issues a command to the base station. The base station executes the command and may report results back to the application controller.

In some applications the zone in which RF tags may reside is larger than the zone covered by a single base station. Two or more base stations are required for coverage. In order to provide continuous coverage, the zones of two or more of the base stations must overlap.

It is important that only one base station of the group covering a large zone be transmitting at any one time. Two base stations transmitting simultaneously could jam a tag in the overlapped area trying to receive a transmission. Further, a transmitting base station could jam another base station receiver trying to detect a low level signal from a tag. The transmissions of the two or more base stations must be coordinated. There are, however, problems associated with the coordination of base stations. One way to coordinate the base stations would be for the application controller to sequentially issue commands to each base station in the group covering the large zone. Problems with having the application controller coordinate the base stations include:

1. The application controller must service each base station for each command, leading to a decrease in system performance. Requiring the application controller to continuously control many base stations could overload the processing capacity of the application controller.

2. It is desirable for one application controller to service many zones. In many cases, the base stations should run autonomously until a significant event occurs, such as a tag entering the zone. In a typical case, the application controller and base stations will be on a local area network. Causing the application controller to continuously service many base stations adds unnecessary network traffic, and could overload the capacity of the network.

3. With a network application controller in the processing loop, the switching time from one base station turning off to another turning on is long and indeterminate. Tags overlapping the RF field of two or more base stations will see the field drop, and the tags will then reactivate when the power comes up again. This event can cause tags to reset. Indeed, passive tags powered by the RF field will lose energy in the tag energy store and tag electronics will not have enough energy to continue functioning. Either event causes a tag to lose the information that it carries which describes the state of the tag. In the case of multiple tag identification, the tag state prevents a tag from being identified more than once in the algorithm. If a tag in overlapping the RF fields from two base station loses state during the field switching, it will be identified more than once, degrading performance.

RELATED APPLICATIONS AND ISSUED PATENTS

Related U.S. Patents assigned to the assignee of the present invention include: U.S. Pat. Nos. 5,521,601; 5,528, 222; 5,538,803; 5,550,547; 5,552,778; 5,554,974; 5,563, 583; 5,565,847; 5,606,323; 5,635,693; 5,673,037; 5,680, 106; 5,682,143; 5,729,201; 5,729,697;5,736,929; 5,739,754; 5,767,789; 5,777,561; 5,786,626; 5,812,065; and 5,821,859. U.S. Patent applications assigned to the assignee of the present invention include: application Ser. No. 08/626,820, filed: Apr. 3, 1996, entitled "Method of Transporting RF Power to Energize Radio Frequency Transponders", by Heinrich, Zai, et al. (now U.S. Pat. No. 5,850,181); application Ser. No. 08/694,606 filed Aug. 9, 1996 entitled RFID System with Write Broadcast Capability by Cesar et al. (now U.S. Pat. No. 5,942,987); application Ser. No. 08/681,741 filed Jul. 29, 1996 entitled RFID Transponder with Electronic Circuitry Enabling and Disabling Capability, by Heinrich, Goldman et al. (now U.S. Pat. No. 5,874,902); and application Ser. No. 09/153,617 1 filed Sep. 25, 1998, entitled RFID Interrogator Signal Processing System for Reading Moving Transponder, by Zai et al. (now U.S. Pat. No. 6,122,329) The above identified U.S. Patents and U.S. Patent applications are hereby incorporated by reference.

OBJECT OF THE INVENTION

An object of this invention is an improved system of two or more RF base stations covering a single zone.

An object of this invention is to allow two or more base stations, once initiated, to coordinate their activities without intervention from an application controller. This greatly decreases the processing requirements of the application controller and traffic on the network connecting the application controller to the base stations.

An object of this invention is to allow two or more base stations to coordinate the switching of RF fields on and off in a fast, deterministic manner, so that RF tags overlapping the RF fields will not detect the field switching.

SUMMARY OF THE INVENTION

The current invention adds one or more circuits for receiving and/or for generating external trigger signals to the signal generator controller which controls a base station RF signal generator. The external trigger signal is sent directly from one base station to another, without intervention of the application controller which controls both base stations.

BRIEF DESCRIPTION OF THE DRAWINGS

FIG. 5 is a block diagram of a method for using the base stations of the invention.

FIG. 6 is a block diagram of a method for continuous identification of tags.

DETAILED DESCRIPTION OF THE INVENTION

Figure 1:
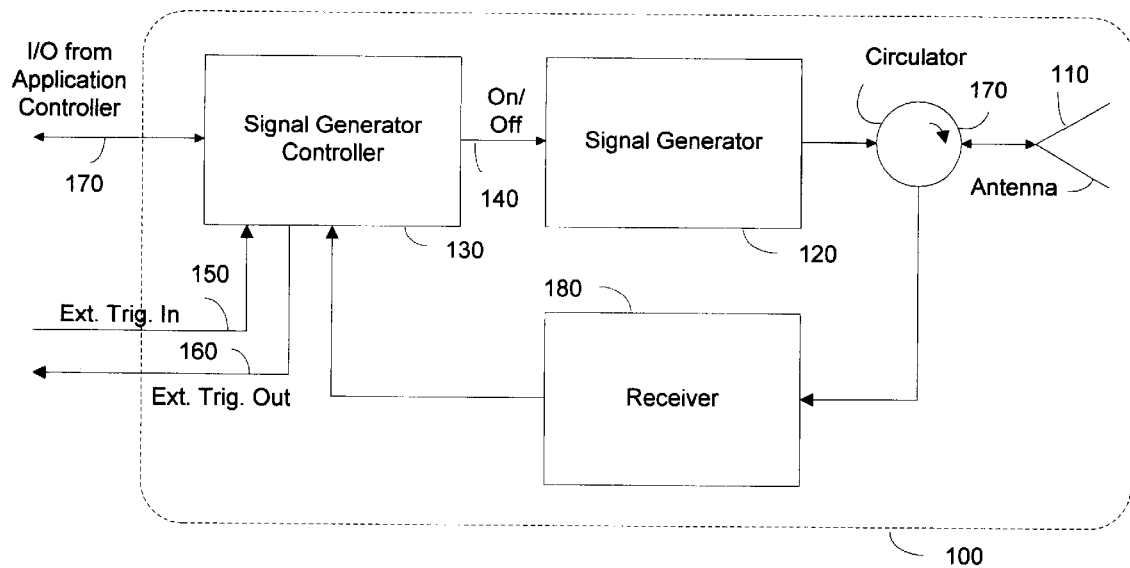
FIG. 1 is a block diagram of a base station of the invention.

FIG. 1 shows an RF base station 100 having a signal generator 120 driving an antenna 110. The signal generator 120 is activated and deactivated by a on/off control line 140 driven by the signal generator controller 130. An optional circulator 170 is shown between the signal generator 120 and the antenna 110 which may take signals received by antenna 110 and route them to optional receiver 180. Receiver 180 then sends demodulated signals to the base station electronics which may be part of the signal generator controller 130.

The signal generator controller 130 has conceptually an external trigger input 150 and an external trigger output 160. Although these can be physically separate signals, the preferred embodiments combine them into a bidirectional signal.

The signal generator controller 130 is programmed by an application controller (shown later) through input/output 170. In a typical application, the signal generator controller 130 is programmed to activate the on/off control line 140 after a count N of trigger deactivations, where the count could be zero or greater.

The application controller initiates an application command. If the count N programmed into the signal generator controller 130 is zero, the signal generator controller activates the signal generator 120 immediately. Otherwise, the signal generator controller 130 continuously polls the trigger input 150, counts deactivations, and activates the signal generator 120 after the count N is reached.

The signal generator controller 130 could be implemented as a state machine using logic gates, a programmable logic device (PLD), or an application specific integrated circuit (ASIC). Creating a state machine using these techniques is well known.

Alternatively, the signal generator controller 130 could be implemented using a micro controller running a software polling program. Writing a program to poll a general purpose micro controller input and activate a general purpose output uses well known techniques.

Figure 2:
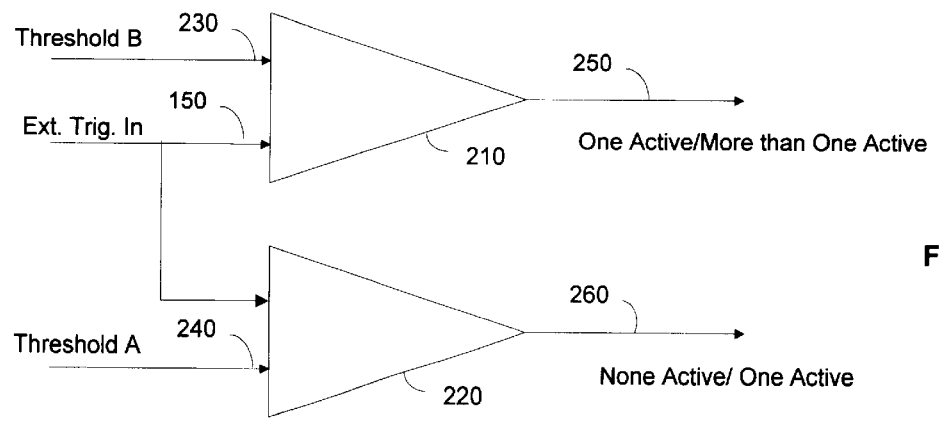
FIG. 2 is a block diagram of an apparatus to detect a multi-state trigger input.

FIG. 2 shows a detail of a preferred implementation of the trigger input circuit. In a preferred embodiment, the trigger input 150 is a multi-state signal wire. The states can be detected using a comparator with a fixed threshold.

Comparator 220 compares the trigger input 150 to a threshold 240 which is set to a point between the states "none active" and "one active." The comparator 220 distinguishes these two states.

Comparator 210 compares the trigger input 150 to a threshold 230 which is set to a point between the states "one active" and "more than one active." The comparator 220 distinguishes these two states.

Thus the output of the circuit of FIG. 2 distinguishes three states. The transition of signal 260 from "one active" to "none active" is counted as a trigger deactivation. The assertion of the signal 250 in the state "more than one active" indicates that more than one base station has its signal generator activated. This can be used as an error condition.

Figure 3:
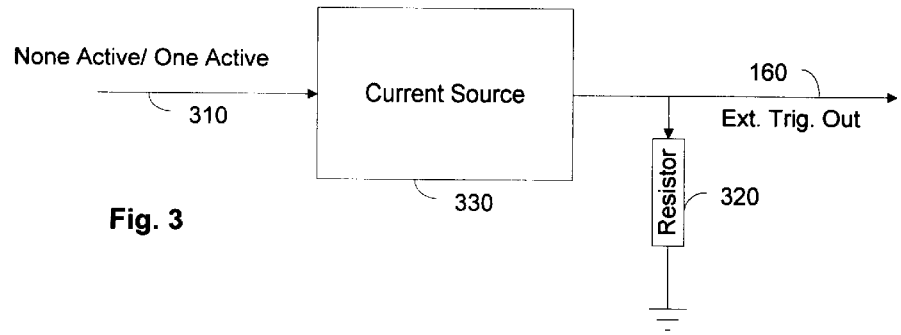
FIG. 3 is a block diagram of an apparatus for generating a multi-state trigger output.

FIG. 3 shows a detail of a preferred implementation of the trigger output circuit. In a preferred application, the "none active/one active" input 310 is actually the RF field on/off signal 140. The input 310 turns on or off a fixed current source 330. The current source 330 drives the trigger out signal 160, the current sinking into a fixed resistive terminator 320.

When the input 310 indicates "none active", the current source is off, no current flows through the terminator 320, and the voltage at trigger out 160 is zero. When the input 310 indicates "one active", the current source is on, current flows through the terminator 320, and the voltage at trigger out 160 is a fixed non-zero level.

In a preferred implementation, multiple base stations have their trigger out signal 160 bused together, but there is only one terminator 320. If more than one base station drives current into the terminator, a higher voltage indicating "more than one active" results on line 160.

Figure 4:
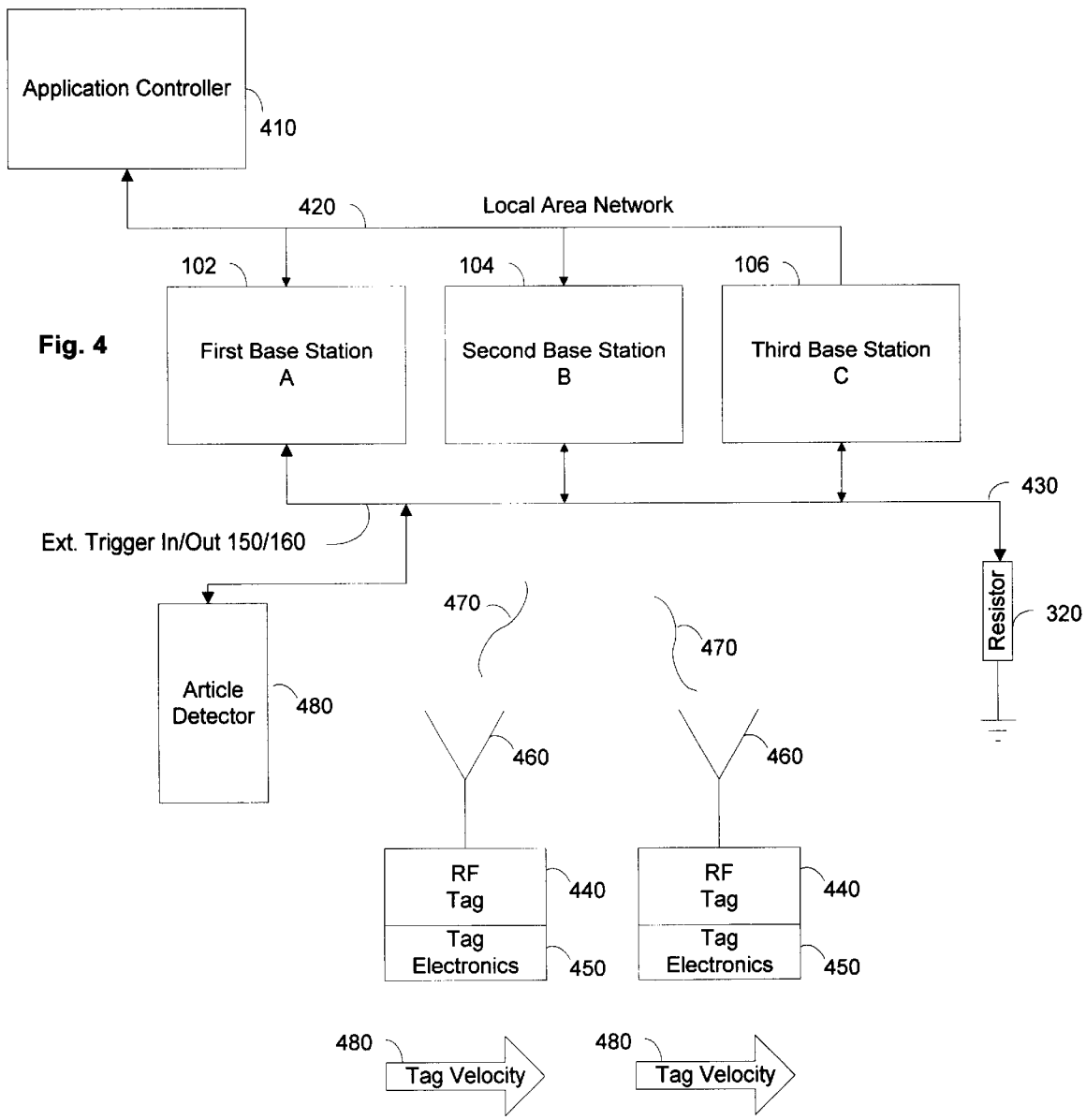
FIG. 4 is a block diagram of a system for using the base stations of the invention.

FIG. 4 shows a preferred implementation of a system of multiple base stations 100 connected to a single application controller 410. For example, three base stations 102, 104, and 106 are shown, along with an optional article detector 480. In the preferred embodiment, the base stations 102, 104, and 106 and application controller 410 are connected by a local area network 420, but other connections are also contemplated.

In the preferred embodiment, the external trigger in 150 and external trigger out 160 are a single bidirectional signal, and the trigger from the first, second, and third base stations are connected to a trigger bus 430 and a resistive terminator 320. Two RF tags 440 with associated tag electronics 450, and tag antennas 460 are shown receiving RF radiation 470 from base station 104. The tags 440 may optionally be relatively moving with respect to the base stations with a tag velocity 480.

One typical application, shown by the block diagram of FIG. 5, is to identify all tags currently in the field. In this case, the first base station A would be programmed by the application controller in step 510 to turn on immediately, the second base station B after one trigger negation, and the third base station C after two negations. The application controller sends out the identification command in step 520. Once the base stations receive the identification command, the first base station A activates its RF field, performs its algorithm, sends out an external trigger negation signal on line 150/160, and turns off in step 530. The second base station B, sensing the first trigger negation, activates its RF field in step 540 and follows the same path. Likewise, when the second base station B finishes sending and sends out the second trigger negation signal, the third base station C activates in step 550. After all the base stations have completed their turns, the process is ended in step 560.

The timing between one base station turning off, and another base station turning on is critical. The time elapsed must be less than the time $t_{Max}$ where a passive tag 440 (a tag without a separate battery to provide the tag electronics 450 with power) in the RF field loses so much energy that the tag electronics 450 no longer function. The time $t_{Max}$ must also be less than a time $t_{Min}$ where the tag can distinguish that the base station transmission has terminated, since the tags are programmed to reset themselves a time $t_{Min}$ after transmission ceases from the base station. The time $t_{Max}$ is preferably 1 millisecond, more preferably 100 microseconds, and most preferably 30 microseconds.

This setup need only be performed once in making a single pass through the identification algorithm.

Several important points are to be noted:

1. Only one command need be sent by the application controller 410. This minimizes network 420 traffic and application controller 410 processing.

2. The switch over among base stations is performed independent of application controller 410 processing and network 420 traffic. The switching time can be minimized and a worst case maximum switchover time $t_{Max}$ can be specified.

A second typical application is continuous identification shown in FIG. 6. In this variation, base station A is told by the application controller in step 610 that it is first in a ring of three base stations. Base station B is told that it is second of three, and base station C the third of three. Then the application controller sends out the identification command in step 620.

Once base stations A, B, and C receive the identification command, base station A becomes active in step 630. Base station B is programmed to start after one trigger, and base station C after two triggers. Once base station A completes, rather than terminating as before, it is reprogrammed to start again after two triggers. Base stations B and C are programmed identically after they complete the first round. Control passes to base station B in step 640, and base station C in step 650. The system returns to step 630 to cycle continuously. The result is a continuous identification, with control passing to base stations A, B, C, A, B, C and so on indefinitely. Once again, there is no application controller 410 processing or network 420 traffic required as the identification process passes from base station to base station.

The actual termination of the process of FIG. 6 can be programmed to be after a tag is identified, after a preset time limit, after a command from the application controller, or other application determined criteria.

A third typical application is processing a moving tag as shown schematically in FIG. 4. Again the setup would be to transmit from base station A followed by base station B followed by base station C if the tag were known to always move in the direction where it would enter the zone of base station A followed by zone B followed by zone C, As an example, tags on a conveyer belt would enter the relevant zones sequentially. Base station A, would first try to process the tag for a time corresponding to the time that a tag would be in the zone of base station A. Once Base station A completed its attempt, control would pass to base station B and then to base station C. In this application, the first trigger signal might come from a detector 480 which detected a moving object moving into the zone covered by base station A.

In one preferred embodiment, the signal generator controller is a digital state machine whose input is the trigger and a programming mechanism. The output of the state machine is the RF field on/off control.

In another preferred embodiment, the signal generator controller is a micro controller programmed to insure guaranteed response time. The trigger is a software readable input and the RF field on/off control is a software controlled output. When suitably programmed, the micro controller continuously polls the trigger input.

In either preferred embodiment, the signal generator controller can be programmed to ignore the trigger input and turn on the RF field, turn on the RF field after the trigger activates and deactivates one or more times, or turn off the RF field and record an error if the trigger indicates that more than one base station's RF field is on.

In one preferred embodiment, the trigger output is a single signal line with multiple states.

In another preferred embodiment, the trigger output is a set of signal lines, each line having only two states.

In another preferred embodiment, the trigger signal is a resistively terminated wire, and the driver is a current source. The resulting voltage across the termination is proportional to the number of base stations driving the trigger.

In a preferred embodiment, the trigger signal is bidirectional, a single wire connected in a bus architecture to each base station. This single wire is both detected by and potentially driven by each base station.

In a preferred system embodiment, multiple base stations covering a zone have their trigger circuits connected together in a bus structure. Each base station is programmed to turn on its RF field based on a programmable count of trigger signals. The result is that the application controller need only initiate the first base station in the sequence, after which time the other base stations will activate in turn without further intervention from the application controller. The sequence can be a series, with the application command terminating after the final base station in the series completes, or it can be a loop, with the command continuing indefinitely until an event is detected. The event can be the detection of tags meeting a certain criteria, reaching a time limit, an object moving out of the zone covered by the tags, or the application controller indicating that the loop should terminate.

In a preferred sequence, base stations which have overlapping fields are adjacent in the programmed sequence, so that tags within the overlap region do not detect the field switching.

In an alternate preferred sequence, base stations turn on in a sequence related to the typical movement of the RF tag in the zone, so that the speed at which moving tags are located is optimized.

Given this disclosure, equivalent embodiments of this invention will be apparent to those skilled in the art. These embodiments are also within the contemplation of the inventors.

Example of equivalent embodiments include, but are not limited to:

A multiple two state digital wire encoding of the trigger state 430 rather than the multi-state analog encoding disclosed.

A base station 100 with separate trigger in 150 and trigger out 160 rather than the bidirectional unified trigger signal 420 disclosed.

A chaining of trigger signals rather than the bus architecture 420 disclosed.

A star arrangement where a trigger pulse is sent from a base station, from the application controller, or from an event detector to a central location, which then sends a trigger pulse to all the base stations.

We claim:

1. A first radio frequency (RF) base station for communicating RF signals with an RF tag and for communicating external trigger signals with at least a second RF base station, comprising;

an RF signal generator for generating RF signals for transmission to the RF tag; and a circuit for communicating the external trigger signal, the external trigger signal causing the second RF base station signal generator to begin transmission, where the trigger signal has multiple detectable states comprising:

a state indicating that no base station has activated the trigger signal;

a state indicating that one base station has activated the trigger signal; and a state indicating that more than one base station has activated the trigger signal.

2. The first base station of claim 1, where the trigger signal in the state that indicates that more than one base station has activated the trigger signal is detected as an error condition requiring the detecting base station to deactivate its signal generator.

3. A first radio frequency (RF) base station for communicating RF signals with an RF tag and for communicating external trigger signals with at least a second RF base station, comprising:

an RF signal generator for generating RF signals for transmission to the RF tag; and a circuit for communicating an external trigger signal, the external trigger signal;

a) if the first base station is transmitting RF signals to the RF tag, causing the second RF base station signal generator to begin transmission at a time no later than 1 ms after the first base station ceases to transmit RF signals to the RF tag; or b) if the second base station is transmitting RF signals to the RF tag, causing the first RF base station signal generator to begin transmission at a time no later than 1 ms after the second base station ceases to transmit RF signals to the RF tag.

* * * * *